United States Patent [19]

Holstein

[11] 4,381,609
[45] May 3, 1983

[54] LENGTH MEASURING INSTRUMENT

[75] Inventor: Siegbert Holstein, Stein, Fed. Rep. of Germany

[73] Assignee: Dr. Johannes Heidenhain GmbH, Traunreut, Fed. Rep. of Germany

[21] Appl. No.: 369,818

[22] Filed: Apr. 19, 1982

Related U.S. Application Data

[63] Continuation of Ser. No. 107,272, Dec. 26, 1979, abandoned.

[30] Foreign Application Priority Data

Jan. 3, 1979 [DE] Fed. Rep. of Germany ....... 2900113

[51] Int. Cl.³ ............................................. G01B 11/02
[52] U.S. Cl. .................................................. 33/125 C
[58] Field of Search .............. 33/125 C; 356/374, 395; 250/237 G

[56] References Cited

U.S. PATENT DOCUMENTS

| | | | |
|---|---|---|---|
| 2,886,717 | 5/1959 | Williamson et al. | 33/125 C X |
| 4,149,319 | 4/1979 | Nelle | 33/125 C |
| 4,170,826 | 10/1979 | Holstein | 33/125 C |
| 4,170,829 | 10/1979 | Nelle | 33/125 C X |
| 4,184,262 | 1/1980 | Kolb et al. | 33/125 C X |
| 4,215,480 | 8/1980 | Fisher et al. | 33/125 C |
| 4,250,381 | 2/1981 | Yoshiike et al. | 33/125 C X |
| 4,276,696 | 7/1981 | Ernst | 33/125 C X |

*Primary Examiner*—Charles E. Phillips
*Attorney, Agent, or Firm*—Hume, Clement, Brinks, Willian & Olds, Ltd.

[57] ABSTRACT

A measuring instrument having a flexible steel measuring scale mounted inside a flanged groove defined by a tubular housing includes a scanning unit, guided along the interior of the housing to scan the scale, and a magnet, mounted on the scanning unit. The magnet acts to pull the steel scale towards the scanning unit, into contact with the flanges of the groove. The spacing between the scanning unit and the flanges is precisely controlled and, therefore, the magnet provides precise control over the spacing between the scale and the scanning unit.

8 Claims, 1 Drawing Figure

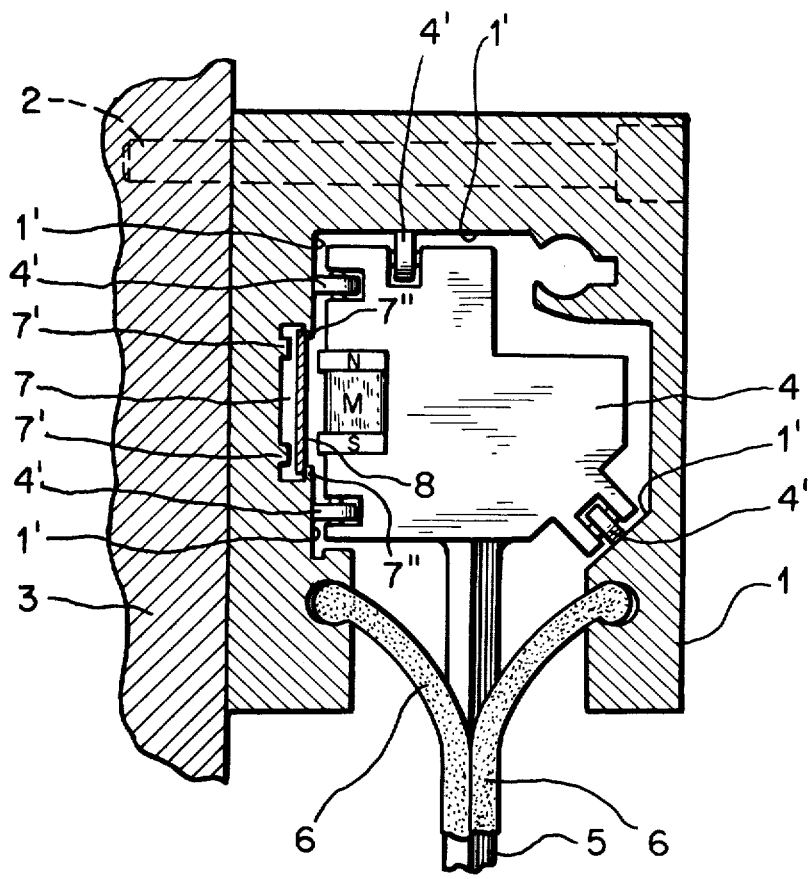

LENGTH MEASURING INSTRUMENT

This application is a continuation of application Ser. No. 107,272, filed 12/26/79 now abandoned.

BACKGROUND OF THE INVENTION

The present invention relates generally to length measuring instruments having a flexible scale and a scanning unit and specifically to an improved apparatus for controlling the separation between the scale and the scanning unit.

U.S. Pat. No. 4,170,826 discloses a measuring instrument which includes a scanning unit and a flexible measuring scale that is mounted inside a flanged groove to provide for longitudinal adjustment of the scale in the groove. Because the scale is moveable in the groove, there will generally be some degree of play between the groove and the scale. This in turn permits some degree of lateral motion, transverse to the plane of the scale. Such lateral motion may alter the separation between the scale and the scanning unit, thereby inducing measurement errors.

SUMMARY OF THE INVENTION

The present invention is directed to an improved means for determining the spacing between a flexible scale and a scanning unit in a length measuring device. According to this invention, the scale includes a magnetically responsive component and the scanning unit includes a magnet oriented to bias the scale toward the desired separation between the scale and the scanning unit.

In the preferred embodiment, the scale is positioned in a flanged groove and the magnet operates to bias the scale towards the scanning unit, against the flanges. The separation between the scanning unit and the flanges is maintained substantially constant, and the magnet therefore serves to provide a substantially constant spacing between the scale and the scanning unit. In this way, measuring errors due to improperly controlled separations between the measuring scale and the scanning unit are largely eliminated.

The invention, together with further objects and attendant advantages, will be best understood by reference to the following detailed description taken in connection with the appended drawing.

BRIEF DESCRIPTION OF THE DRAWING

The drawing is a cross-sectional view of a preferred embodiment of the length measuring instrument of this invention.

DETAILED DESCRIPTION OF A PREFERRED EMBODIMENT

Referrng now to the drawings, a preferred embodiment of the present invention will be described in connection with the attached drawing. With certain exceptions to be explained below this FIGURE corresponds to a cross-section of the longitudinal measuring instrument disclosed in U.S. Pat. No. 4,170,826. The specification of this patent is hereby incorporated by reference. In the FIGURE a rigid tubular housing 1 is mounted to a support surface 3 by means of threaded fasteners 2. This housing 1 defines three separate guide surfaces 1' which serve to guide a scanning unit 4 along the length of a longitudinal measuring scale 8. The scanning unit 4 includes guide rollers 4' which bear against the three guide surfaces 1' to precisely position the scanning unit 4 within the housing 1. The scanning unit 4 is connected to an element (not shown) by means of an entrainment member 5. Resilient sealing elements 6 are mounted to the housing 1 to substantially seal the housing around the entrainment member 5.

As explained more fully in U.S. Pat. No. 4,170,826, the scale 8 resides inside a flanged groove 7. This groove is provided with a pair of raised ridges 7' which limit the movement of the scale away from the scanning unit 4. A flange 7" is provided at each edge of the groove 7. These flanges 7" extend over a portion of the groove 7, thereby narrowing the groove 7 to a point where the scale 8 is embraced on four sides.

The scale 8 is mounted within the groove 7 in such a manner that it is free to move longitudinally substantially without distortion. In order to obtain this freedom of movement certain tolerances must be present between the groove 7 and the scale 8. During manufacture the dimensions of the groove 7, the ridges 7' and the flanges 7" are carefully maintained in order to limit the lateral motion of the scale 8. However, inevitably certain manufacturing tolerances are present, and the scale is therefore free to move laterally with respect to the scanning unit 4 to some degree. This causes the separation between the scale 8 and the scanning unit 4 to vary somewhat. While the variation in separation may be considered negligible in a measuring apparatus having a relatively coarse grid constant, or spacing, in measuring instruments utilizing relatively fine grid spacing, if the separation between the scale 8 and the scanning unit 4 departs from a predetermined range, measuring errors can occur. The danger of measuring errors is especially great when measurements are made over large lengths or when repetitive measurements are made, for in these cases errors can accumulate. Such measurement errors occur especially when the measurement signals generated by the scanning unit are no longer generated uniformly due to undefined spacing between the division plane of the scale 8 and the reading unit of the scanning unit 4.

In order to maintain a more nearly constant spacing between the scale 8 and the scanning unit 4, a magnet M is included in this preferred embodiment and the scale 8 is formed from a magnetically responsive material such as steel. The magnet M is mounted at a suitable point on the scanning unit 4 such that the magnetically responsive scale 8 is drawn toward the scanning unit 4 into contact with the flanges 7". In this way the scale 8 is brought to a predetermined, reproducible position in the groove 7. Since the scanning unit 4 is guided precisely along the guide surfaces 1', and the separation between the scanning unit 4 and the flanges 7" is therefore constant, a substantially constant separation between the scale 8 and the scanning unit 4 is thereby obtained.

The apparatus of this invention precisely controls the separation between the measuring scale 8 and the scanning unit 4 and it therefore substantially reduces measuring errors due to an improper spacing. Furthermore, the position of the scale 8 is precisely controlled without any physical contact between the scanning unit 4 and the scale 8.

Of course, it should be understood that various changes and modifications to the preferred embodiment described herein will be apparent to those skilled in the art. For example the scale 8 can include magnets such that the magnet M operates to push the scale 8 away from the scanning unit 4. In addition, means other than the groove 7 and the flanges 7" can be used to determine the separation between the scale 8 and the scanning unit 4. One or more magnets can be placed on the scanning unit 4 such that the desired positioning of the scale 8 is obtained. Such changes in modifications can be made without departing from the spirit or scope of the present invention and without diminishing its intended advantages. It is therefore intended that such changes and modifications be covered by the following claims.

I claim:

1. In a length measuring instrument including a flexible measuring scale; a scanning unit for scanning the scale; means for mounting the scale to a first object such that at least a portion of the scale is movable transversely to the length of the scale, and means for mounting the scanning unit to a second object movable with respect to the first object, wherein the scanning unit operates to generate a signal responsive to the position of the first object with respect to the second object, the improvement comprising:
   means independent of the scale for guiding the scanning unit;
   at least one magnet mounted to the scanning unit;
   said scale including a magnetically responsive component;
   said magnet oriented to bias the flexible scale with respect to the scanning unit such that the separation between the scale and a portion of the scanning unit is maintained substantially constant.

2. The improvement of claim 1 wherein the magnet is oriented to bias the scale toward the scanning unit.

3. The improvement of claim 1 wherein the scale mounting means includes means for defining a longitudinal groove sized to receive the scale and first and second flanges secured adjacent the groove and extending over a portion of the groove to narrow at least a portion of the groove to a width narrower than that of the scale, and further, wherein the magnet acts to bias the scale toward the scanning unit, against the inner surfaces of the first and second flanges.

4. In a length measuring instrument including a flexible measuring scale, a scanning unit, and means for guiding the scanning unit along the scale, the improvement comprising:
   the guiding means being independent of the scale;
   means for defining a spacing member extending parallel to at least a portion of the scale, said spacing member positioned at a predetermined separation from the scanning unit; and
   means, included in the scanning unit, for magnetically biasing that portion of the scale adjacent the scanning unit into contact with the spacing member such that the separation between the scale and the scanning unit adjacent the biasing means is maintained substantially constant.

5. The improvement of claim 4 further including means for embracing the scale in a longitudinally displaceable manner, wherein the means for defining a spacing member is included in the embracing means.

6. In a longitudinal measuring instrument including a flexible scale having first and second end sections; means for mounting the first and second end sections to a first object; a housing extending around the scale, said housing defining a groove for receiving the scale and first and second flanges extending along the length of the groove to narrow the groove, thereby capturing the scale in the groove; a scanning unit; and means for guiding the scanning unit on the housing along the scale within the housing; the improvement comprising:
   at least one magnet secured to the scanning unit;
   said scale including a magnetically responsive component such that the magnet operates to bias the scale toward the scanning unit against the first and second flanges, thereby providing a substantially constant separation between the scale and a portion of the scanning unit.

7. In an encapsulated longitudinal measuring device including a flexible measuring scale extending along a longitudinal direction, a tubular member surrounding at least a portion of the measuring scale and secured to a first object, and a scanning unit guided along the scale by the tubular member and coupled to a second object relatively movable with respect to the first object, the improvement comprising:
   means, included in the tubular member, for embracing the measuring scale inside the tubular member in a longitudinally and laterally displaceable manner, substantially without applying distorting or clamping forces thereto;
   a magnetically responsive component included in the scale; and
   means, included in the scanning unit, for magnetically biasing the scale against the embracing means without contacting the scale, the embracing means and the biasing means configured to provide a substantially constant separation between the scanning unit and an adjacent portion of the scale.

8. An encapsulated longitudinal measuring device comprising:
   a tubular member;
   a groove defined in the tubular member;
   a flange of a substantially constant thickness formed in the tubular member adjacent the groove, said flange operating to narrow the groove to a predetermined width;
   a flexible measuring scale defining first and second end sections, the scale being disposed in the groove so as to be displaceable along the length and depth of the groove and having a width greater than the predetermined width, the scale including a magnetically responsive component;
   means for mounting the tubular element to a first object;
   means for securing the first and second end sections of the scale to the first object;
   a scanning unit connected to a second object, relatively movable with respect to the first object, said scanning unit guided along the scale by the tubular member, the scanning unit including at least one magnet oriented to bias without contacting the flexible scale toward the scanning unit against the flange to provide a substantially constant separation between the scanning unit and the portion of the scale lying adjacent the at least one magnet.

* * * * *